US00RE41639E

(19) United States
(12) Reissued Patent
Lin

(10) Patent Number: US RE41,639 E
(45) Date of Reissued Patent: Sep. 7, 2010

(54) METHOD FOR DETERMINING A WRITING POWER OF AN OPTICAL DISC DRIVE THROUGH A SHIFTABLE POLYNOMIAL FUNCTION CAPABLE OF BEING SHIFTED ACCORDING TO A DIFFERENCE BETWEEN A REAL READ-BACK SIGNAL PARAMETER AND A TARGET READ-BACK SIGNAL PARAMETER

(76) Inventor: Tsung-Chih Lin, 8F, No.533, Chung-Cheng Rd., Hsin-Tien City, Taipei Hsien (TW)

(21) Appl. No.: 11/944,417

(22) Filed: Nov. 22, 2007

Related U.S. Patent Documents

Reissue of:
(64) Patent No.: 6,967,915
Issued: Nov. 22, 2005
Appl. No.: 10/064,521
Filed: Jul. 24, 2002

(30) Foreign Application Priority Data

Jan. 11, 2002 (TW) ..... 91100340 A

(51) Int. Cl.
*G11B 7/00* (2006.01)

(52) U.S. Cl. ..... 369/47.53; 369/53.18

(58) Field of Classification Search ..... 369/47.5, 369/47.53, 53.18
See application file for complete search history.

(56) References Cited

U.S. PATENT DOCUMENTS

| | | | | | |
|---|---|---|---|---|---|
| 5,185,733 | A | | 2/1993 | Finkelstein et al. | |
| 5,268,893 | A | | 12/1993 | Call et al. | |
| 5,703,841 | A | | 12/1997 | Hiroki | |
| 5,790,491 | A | | 8/1998 | Jaquette et al. | |
| 5,793,737 | A | * | 8/1998 | Den Boef | 369/47.53 |
| 5,978,351 | A | * | 11/1999 | Spruit et al. | 369/275.3 |
| 6,134,209 | A | | 10/2000 | Den Boef | |
| 6,542,917 | B1 | | 4/2003 | Watanabe et al. | |
| 6,557,126 | B1 | | 4/2003 | Kelly | |

* cited by examiner

*Primary Examiner*—Paul Huber
(74) *Attorney, Agent, or Firm*—Perkins Coie LLP

(57) ABSTRACT

A method for determining an optimum writing power of a compact disc drive includes representing the relationship between a target read-back signal parameter and writing power as a polynomial function, which is stored in a database. The optimum writing power is obtained after at least one iteration of a writing test procedure. The test procedure includes utilizing a constant writing power.

19 Claims, 6 Drawing Sheets

METHOD FOR DETERMINING A WRITING POWER OF AN OPTICAL DISC DRIVE THROUGH A SHIFTABLE POLYNOMIAL FUNCTION CAPABLE OF BEING SHIFTED ACCORDING TO A DIFFERENCE BETWEEN A REAL READ-BACK SIGNAL PARAMETER AND A TARGET READ-BACK SIGNAL PARAMETER

Matter enclosed in heavy brackets [ ] appears in the original patent but forms no part of this reissue specification; matter printed in italics indicates the additions made by reissue.

BACKGROUND OF INVENTION

1. Field of the Invention

The present invention relates to a writing power control method of a compact disc drive, and more specifically, the present invention discloses a writing power control method capable of determining an optimum writing power of a compact disc drive.

2. Description of the Prior Art

In general, document management and storage is an important concern of companies and individuals. In the past, most documents were printed or written on paper but when the quantity of these documents is large, the volume and weight of them becomes a problem. In parallel with the development of computer technology, digitalized data is widely used and stored by use of computer storage media. A wide variety of storage devices is available for allowing users to store digital data conveniently. A compact disc drive, which uses small, inexpensive and high capacity compact discs as storage media, is a popular and effective storage device.

Generally, before writing data onto a compact disc, the compact disk drive must perform an optimum power control (OPC) to determine an appropriate writing power of the compact disc. As to a preferred method of performing the OPC, details can be found in the Orange Book and are summarized as follows.

Please refer to FIG. 1. FIG. 1 is a diagram of a compact disc 10 when a compact disc drive performs the OPC on the compact disc 10 according to the prior art. When the compact disc drive performs the OPC, a pick-up head 11 of the compact disc drive first retrieves an indicative optimum writing power P from a lead-in area 12 on the compact disc 10. The indicative optimum writing power P is an appropriate writing power of the compact disc 10 that a compact disc manufacturer suggests. Then, the pick-up head 11 uses fifteen writing powers, which comprises seven writing powers, P1 to P7 , less than the indicative optimum writing power P, the indicative optimum writing power P itself, and seven writing powers, P8 to P14, greater than the indicative optimum writing power P, to perform a writing procedure in fifteen successive blocks 18 of the test area 16 of the compact disc 10.

After performing the writing procedure, the pick-up head 11 will retrieve a result written to the blocks 18 as a read-back signal. The read-back signal is an AC coupled HF signal. The Orange Book has defined a symmetrical parameter β determined from the read-back signal. When the symmetrical parameter β of the read-back signal corresponds to a predetermined requirement, the corresponding writing power can serve as the actual optimum writing power of the compact disc 10. After retrieving the test results of the fifteen writing powers, the pick-up head 11 obtains the symmetrical parameter β values (β values) of the fifteen read-back signals corresponding to the fifteen writing powers. Then, the compact disc drive compares the β values of the fifteen read-back signals with a target β value stored in the lead-in area 12 of the compact disc 10. If the smallest difference between the corresponding β value of one of the fifteen writing powers and the target β value is less than a predetermined value, the writing power corresponding to the above β value is the optimum writing power. If the differences between the corresponding β values of the fifteen writing powers and the target β value are all greater than a predetermined value, the fifteen writing powers are all unsuitable to function as actual writing powers. Consequently, additional groups of fifteen writing powers need to be selected to perform the optimum writing power control until an optimum writing power is obtained.

The aforementioned writing power control has two main shortcomings. First, the method uses a trial and error approach without the benefits of recursion. If the initial fifteen writing powers selected are inadequate, additional time must be spent in successive trials. Second, the aforementioned writing power control utilizes different writing powers during a short time interval. It is easy for the pick-up head 11 to accidentally move to the next block to produce an incorrect etching depth during the writing test because of the unstable writing power. As a result, erroneous β values may be obtained, which further influences the accuracy of the determined optimum writing power, and ultimately writing quality.

SUMMARY OF INVENTION

It is therefore a primary objective of the claimed invention to provide a writing power control method utilizing a polynomial function capable of determining an optimum writing power of a compact disc drive so as to solve the above-mentioned problems.

The claimed invention, briefly summarized, discloses a method for determining an optimum writing power of a compact disc drive. The method includes constructing a polynomial function which represents a relationship between a writing power and a target read-back signal parameter and retrieving a target read-back signal parameter from a compact disc and determining a corresponding first writing power according to the polynomial function. Followed by, performing a writing test procedure using the first writing power to determine a real read-back signal parameter and comparing the real read-back signal parameter with the target read-back signal parameter. Subsequently, if a difference between the real read-back signal parameter and the target read-back signal is less than a predetermined value, then writing data in the compact disc using the first writing power. The method also includes, shifting the polynomial function according to the real read-back signal parameter, and determining a second writing power according to the shifted polynomial function and the target read-back signal parameter. Additionally, performing a writing test procedure repeatedly, until the difference between the real and target read-back signal parameters is less than a predetermined value.

It is an advantage of the claimed invention that the claimed optimum writing power control method constructs a database of the writing power and the read-back signal parameter in advance, and retrieves corresponding data of a polynomial function before writing data onto a compact disc. Thus, a compact disc drive can quickly obtain the optimum writing power through the target read-back parameter value recorded in the lead-in area of the compact disc.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
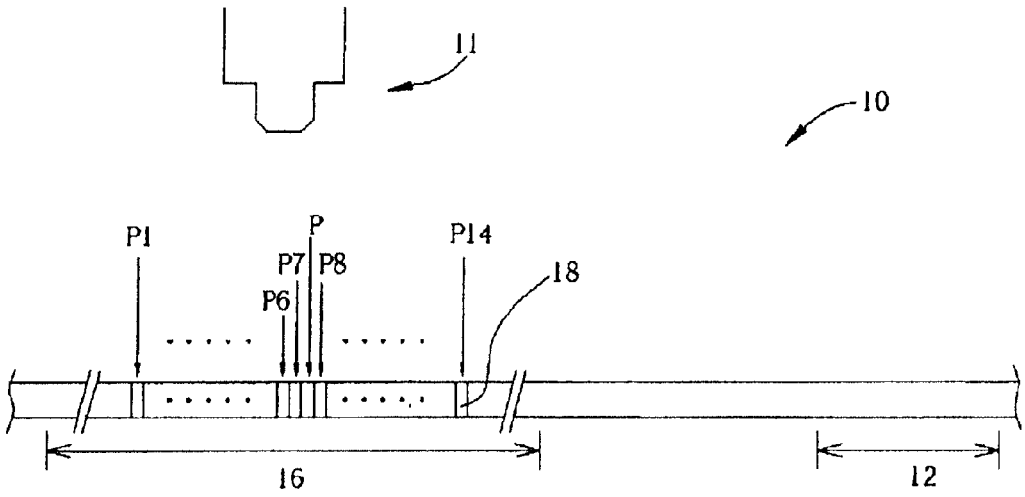
Fig. 1 Prior art
FIG. 1 is a diagram of a compact disc when a compact disc drive performs an optimum power control to the compact disc according to the prior art.
Figure 2:
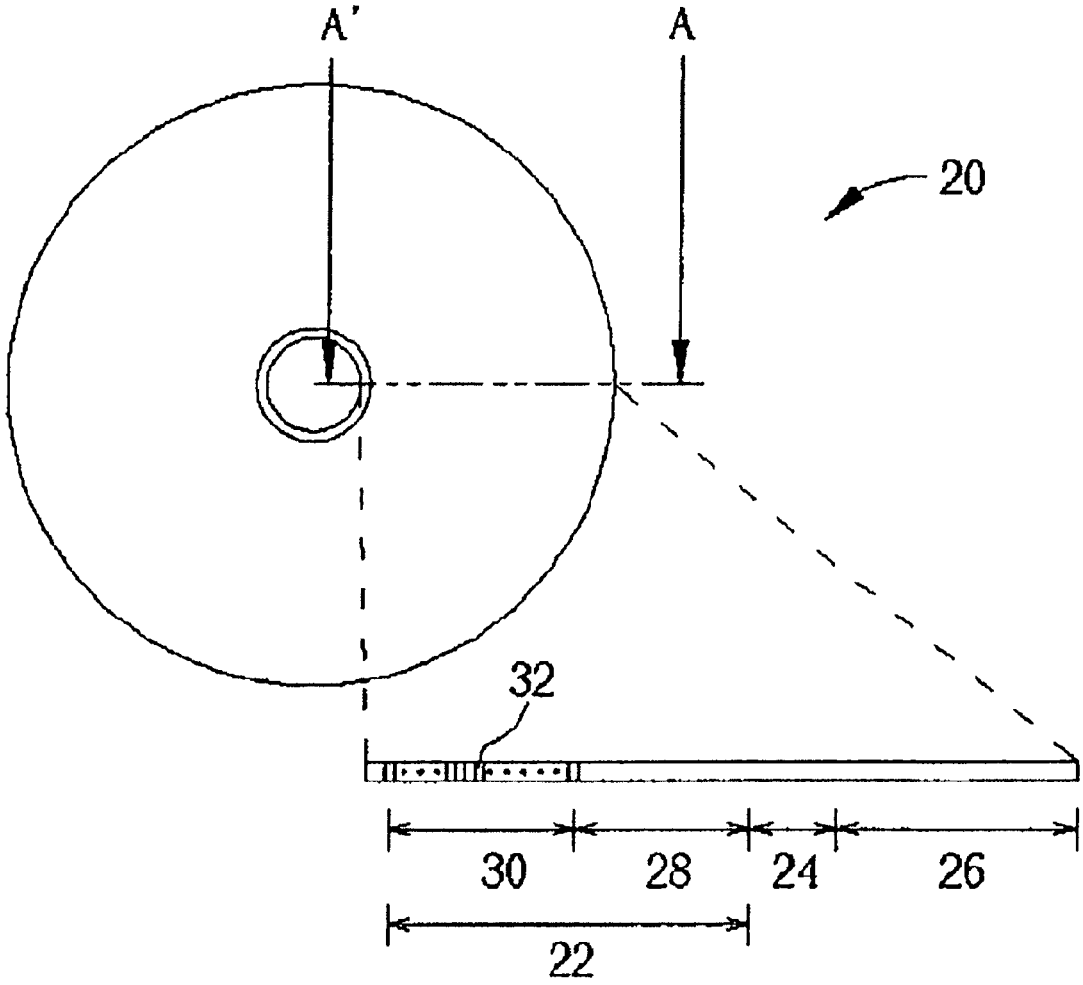
FIG. 2 is a diagram of a common recordable compact disc (CD-R) or rewritable compact disc (CD-RW).

Please refer to FIG. 2. FIG. 2 is a diagram of a common recordable compact disc (CD-R) or rewritable compact disc (CD-RW). The compact disc 20 is used to record data using a CD-R or CD-RW drive. For the purpose if this description a CD-R system will be used, employing β values for the read-back signal parameters, but this is not limiting and a CD-RW can also be used, employing γ values for the read-back signal parameters. The compact disc 20 comprises a power calibration area (PCA) 22 for performing a writing test procedure, a lead-in area 24 which records an indicative optimum writing power and a target read-back signal parameter value (β value) of the compact disc 20, and a storage area 26 for recording user data. The power calibration area 22 comprises a count area 28 and a test area 30. The test area 30 comprises a plurality of blocks 32, and each block can be used for the writing test procedure once. Furthermore, after the compact disc drive performs the writing test procedure to fifteen blocks 32 of the test area 30, a count of the count area 28 is increased by one.

Figure 3:
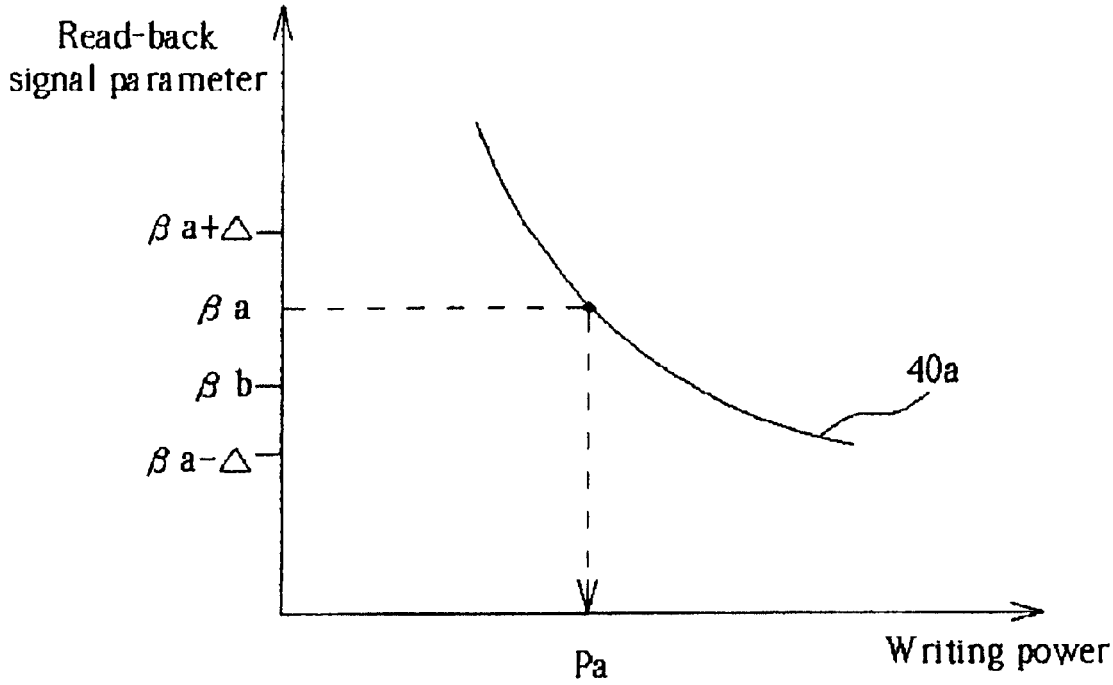
FIG. 3 is a graph of a polynomial function used for determining an optimum writing power according to the present invention.

Please refer to FIG. 3. FIG. 3 is a graph of a polynomial function 40a used in determining an optimum writing power according to the present invention. The horizontal axis represents writing power, and the vertical axis represents read-back signal parameter β. The present invention utilizes the polynomial function 40a which represents a relationship between the writing power and the target read-back signal parameter β. A target β value is stored in the lead-in area 24 of the compact disc 20.

The β value of the read-back signal (AC coupled HF) of the compact disc drive must be within tolerance of the target β value for the writing power to be acceptable. The present invention utilizes the polynomial function 40a to obtain an appropriate writing power Pa according to the target β. As shown in FIG. 3, if the target β value is β a, a writing power Pa is obtained according to the polynomial function 40a.

Figure 4:
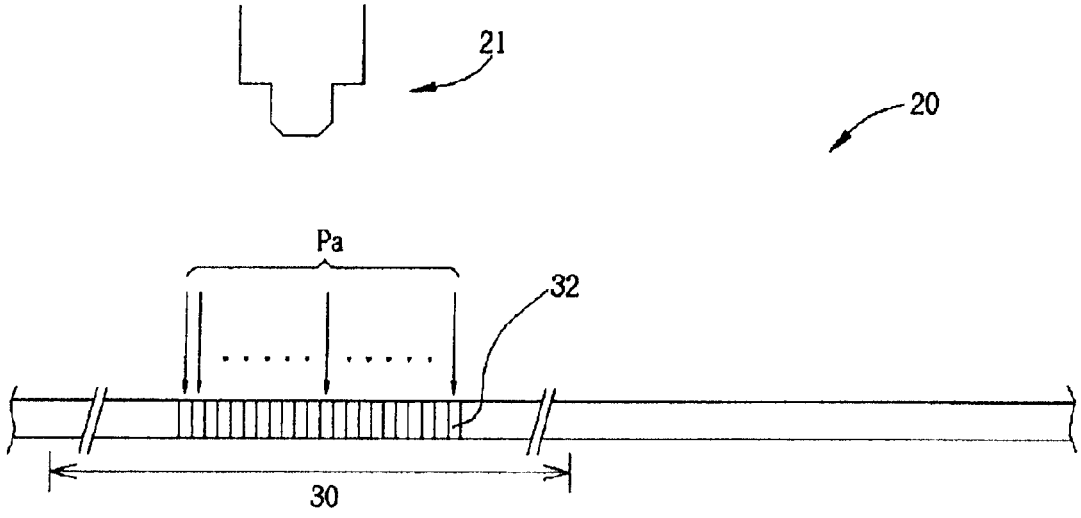
FIG. 4 is a diagram of a compact disc when a compact disc drive performs a writing test procedure according to the present invention.

Please refer to FIG. 4. FIG. 4 is a diagram of the compact disc 20 when the compact disc drive performs a writing test procedure according to the present invention. After obtaining the writing power Pa, the compact disc drive can utilize the writing power Pa to perform the writing test procedure in the test area 30 of the compact disc 20 so as to obtain a corresponding read-back signal parameter value β b. In the preferred embodiment of the present invention, a power calibration procedure utilizes a constant writing power to perform the writing test procedure to fifteen successive blocks among the blocks 32, and to determine the real read-back signal parameter according to an average result of the read-back signal parameters obtained from the plurality of middle blocks of the fifteen blocks or according to a single result of a read-back single parameter obtained from the middle block of the fifteen blocks . When the pick-up head 21 moves to the middle blocks of the fifteen blocks, the outputted writing power Pa has become stable, and the blocks 32 can thus receive the proper etching depth of the writing power Pa. Accordingly, a reliable read-back signal parameter value β b is obtained.

Please refer to FIG. 3 again. After obtaining β b according to methods of the present invention, the next step is to compare the read-back signal parameter value β b with the target read-back signal parameter value β a to determine if the writing power is acceptable. If a difference between the read-back signal parameter value β b and the target read-back signal parameter value β a is less than an allowable error Δ, that is, the read-back signal parameter value β b is located between β a+Δ and β a− as shown in FIG. 3, then the writing power Pa is suitable as the optimum writing power. However, if the difference between the read-back signal parameter value β b and the target read-back signal parameter value β a is greater than the allowable error Δ, the writing power Pa is unacceptable and requires adjustment. This adjustment is accomplished by modifying the polynomial function 40a.

Figure 5:
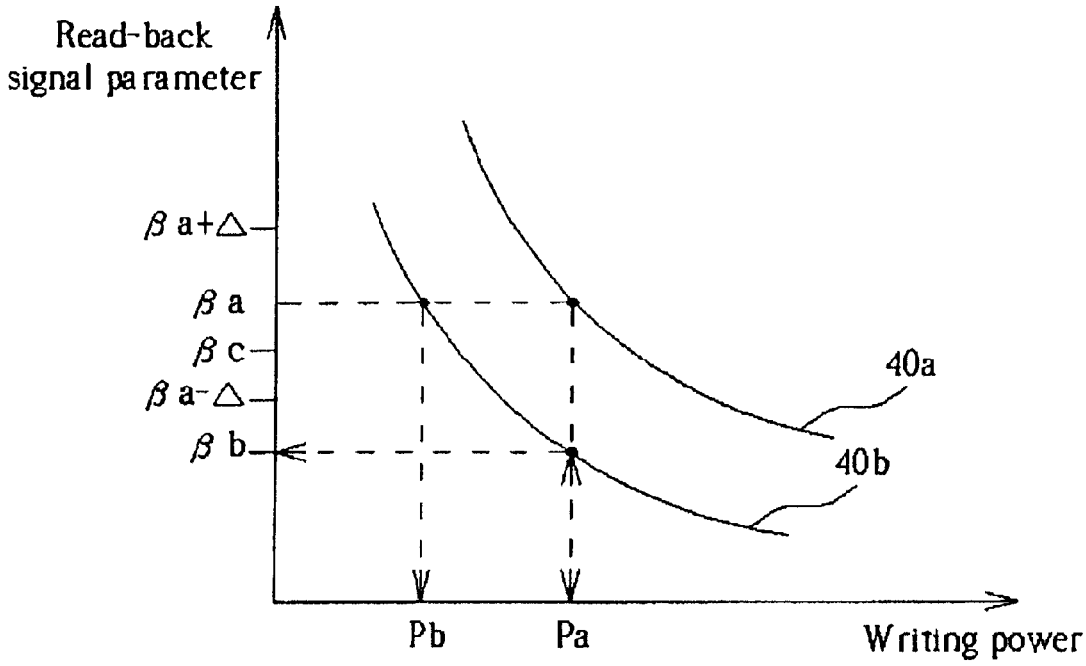
FIG. 5 is a modified graph of the polynomial function shown in FIG. 3.

Please refer to FIG. 5. FIG. 5 is a modified graph of the polynomial function 40a shown in FIG. 3. As shown in FIG. 5, when the read-back signal parameter value β b is located outside of the allowable error range β a+Δ−β a−Δ, the polynomial function 40a is shifted vertically, in this case downward, by an amount equal to the difference between the read-back signal parameter value β b and the target read-back signal parameter value β a. A new polynomial function 40b is thus obtained. A new writing power Pb can now be obtained according to the original target read-back signal parameter value β a and the shifted polynomial function 40b. The writing power Pb is used to perform the writing test procedure as shown in FIG. 4 to obtain a corresponding read-back signal parameter value β c. If the difference between the read-back signal parameter value β c and the target read-back signal parameter value β a is less than the allowable error Δ as shown in FIG. 5, the writing power Pb is the desired optimum writing power. However, if the difference between the read-back signal parameter value β c and the target read-back signal parameter value β a is greater than the allowable error Δ, the aforementioned procedure of shifting the polynomial function and retesting the writing power is repeated until the difference between the read-back signal parameter and the target read-back signal parameter value β a is less than the allowable error Δ.

It needs be specified that the polynomial function 40a is stored in a database in advance, and the database comprises a plurality of polynomial functions. A given polynomial function is based on the material and rotational speed of the compact disc. In general, the polynomial functions required for compact discs produced by different manufacturers are likely to be different, as well as compact discs produced by the same manufacturer under different rotational speeds. Each polynomial function is generated utilizing experimental data and a polynomial curve fitting method. Accordingly, the database of polynomial functions is constructed using this empirical data. The database can be stored in a computer system or the compact disc drive itself for retrieval of the related polynomial function when recording data to a compact disc.

Figure 6:
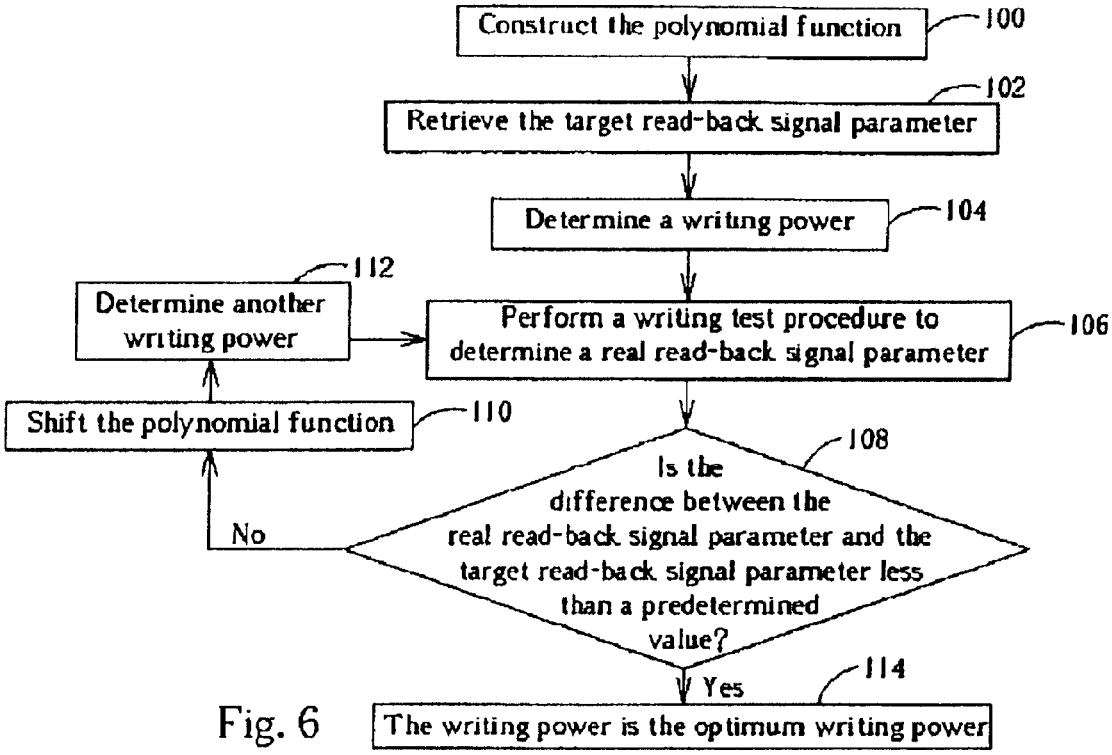
FIG. 6 is a flowchart of a writing power control method according to the present invention.

Please refer to FIG. 6. FIG. 6 is a flowchart of the writing power control method according to the present invention, and can be summarized as follows.

Step 100:Construct the appropriate polynomial function from the database;

Step 102:

Retrieve the target read-back signal parameter value of the compact disc 20 from the lead-in area 24;

Step 104:

Determine a writing power corresponding to the target read-back signal parameter value according to the polynomial function;

Step 106:

Perform a writing test procedure on the compact disc using the writing power to determine a real read-back signal parameter value according to an average result of the read-back signal parameters obtained from the plurality of middle blocks of the successive blocks 32 or according to a single result of the read-back signal parameter obtained from the middle block of the successive blocks 32;

Step 108:

Is the difference between the real read-back signal parameter and the target readback signal parameter less than a predetermined value? If yes, perform step 114. If no, perform step 110;

Step 110:

Shift the polynomial function according to the difference between the real readback signal parameter and the target read-back signal parameter;

Step 112:

Determine another writing power and perform step 106 according to the shifted polynomial function and the target read-back signal parameter value;

Step 114:

The writing power is the desired optimum writing power.

The compact disc drive can thus obtain quickly and precisely the optimum writing power.

In contrast to the prior art, the present writing power control method constructs a database of writing powers and read-back signal parameters in advance, and retrieves a corresponding polynomial function from this database before writing data onto a compact disc. The polynomial function is used in an iterative process to shorten the time required in determining the optimum writing power of the compact disc drive. Furthermore, the present optimum writing power control method uses a constant writing power during the writing power test procedure. Maintaining a constant writing power during the course of the test procedure improves the accuracy of the determined optimum writing power and writing quality.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A writing power control method of an optical disc drive for determining the writing power utilized for writing data onto an optical disc;

the writing power control method comprising:

(a) constructing a [polynomial] function which represents a relationship between a writing power and a target read-back signal parameter;

(b) retrieving the target read-back signal parameter from the optical disc;

(c) determining a first writing power corresponding to the target read-back signal parameter according to the [polynomial] function;

(d) selecting successive blocks from a test area of the optical disc, performing a writing test procedure on the successive blocks utilizing the first writing power then determining a real read-back signal parameter according to an average result of read-back signal parameters obtained from a plurality of blocks of the successive blocks;

(e) comparing the real read-back signal parameter with the target read-back signal parameter; and (f) if a difference between the real read-back signal parameter and the target read-back signal parameter is less than a predetermined value, writing data in the optical disc utilizing the first writing power.

2. The writing power control method of claim 1 wherein if the difference between the real read-back signal parameter and the target read-back signal parameter is greater than the predetermined value, step(e) further comprises shifting the [polynomial] function according to the real read-back signal parameter, determining a second writing power according to both the shifted [polynomial] function and the target read-back signal parameter, and performing the writing test procedure again until the difference between the real and target read-back signal parameters is less than the predetermined value.

3. The writing power control method of claim 1 wherein the optical disc comprises a power calibration area (PCA) for performing the writing test procedure to determine the writing power.

4. The writing power control method of claim 3 wherein the power calibration area comprises a test area for performing the writing test procedure and a count area for recording an execution number of the writing test procedure, the test area comprises a plurality of blocks, each block is capable of performing the writing test procedure once, and the writing test procedure comprises:

selecting successive blocks from the test area;

performing the writing test procedure on the successive blocks using the first writing power; and determining the real read-back signal parameter according to a single result of a read-back signal parameter obtained from the middle block of the successive blocks.

5. The writing power control method of claim 1 wherein the optical disc drive is a CD-R drive, and the target read-back signal parameter is a $\beta$ value of a read-back signal according to a specification of the CD-R drive.

6. The writing power control method of claim 1 wherein the optical disc drive is a CD-RW drive, and the target read-back signal parameter is a $\gamma$ parameter of a read-back signal according to a specification of the CD-RW drive.

7. The writing power control method of claim 1 wherein the optical disc comprises a lead-in area, and the target read-back signal parameter is retrieved from data stored in the lead-in area.

8. The writing power control method of claim 1 wherein the [polynomial] function is constructed from a [polynomial] curve fitting method.

9. A writing power control method of an optical disc drive for determining the writing power utilized for writing data onto an optical disc;

the writing power control method comprising:

(a) constructing a [polynomial] function which represents a relationship between a writing power and a target read-back signal parameter;

(b) retrieving the target read-back signal parameter from the optical disc;

(c) determining a first writing power corresponding to the target read-back signal parameter according to the [polynomial] function;

(d) performing a writing test procedure utilizing the first writing power to determine a real read-back signal parameter;

(e) comparing the real read-back signal parameter with the target read-back signal parameter; and (f) if a difference between the real read-back signal parameter and the target read-back signal parameter is greater than the predetermined value, shifting the [polynomial] function according to the real read-back signal parameter, determining a second writing power according to the shifted [polynomial] function and the target read-back signal parameter, and performing a writing test procedure again until the difference between the real and target read-back signal parameters is less than the predetermined value to determine the writing power of the optical disc drive.

10. The writing power control method of claim 9 wherein if the difference between the real read-back signal parameter and the target read-back signal parameter is less than the predetermined value, step(e) further comprises writing data in the optical disc utilizing the first writing power.

11. The writing power control method of claim 9 wherein the optical disc comprises a power calibration area (PCA) for performing the writing test procedure to determine the writing power.

12. The writing power control method of claim 11 wherein the power calibration area comprises a test area for performing the writing test procedure and a count area for recording an execution number of the writing test procedure, the test area comprises a plurality of blocks, each block is capable of performing the writing test procedure once, and the writing test procedure comprises:

selecting successive blocks from the test area;

performing the writing test procedure on the successive blocks using the first writing power; and determining the real read-back signal parameter according to an average result of read-back signal parameters obtained from a plurality of middle blocks of the successive blocks.

13. The writing power control method of claim 11 wherein the power calibration area comprises a test area for performing the writing test procedure and a count area for recording an execution number of the writing test procedure, the test area comprises a plurality of blocks, each block is capable of performing the writing test procedure once, and the writing test procedure comprises:

selecting successive blocks from the test area;

performing the writing test procedure on the successive blocks using the first writing power; and determining the real read-back signal parameter according to a single result of a read-back signal parameter obtained from the middle block of the successive blocks.

14. The writing power control method of claim 9 wherein the optical disc drive is a CD-R drive, and the target read-back signal parameter is a $\beta$ value of a read-back signal according to a specification of the CD-R drive.

15. The writing power control method of claim 9 wherein the optical disc drive is a CD-RW drive, and the target read-back signal parameter is a $\gamma$ value of a read-back signal according to a specification of the CD-RW drive.

16. The writing power control method of claim 9 wherein the optical disc comprises a lead-in area, and the target read-back signal parameter is retrieved from data stored in the lead-in area.

17. The writing power control method of claim 9 wherein the [polynomial] function is constructed from a [polynomial] curve fitting method.

*18. The writing power control method of claim 1 wherein the function is a polynomial function.*

*19. The writing power control method of claim 9 wherein the function is a polynomial function.*

* * * * *

UNITED STATES PATENT AND TRADEMARK OFFICE

CERTIFICATE OF CORRECTION

PATENT NO. : RE 41,639 E
APPLICATION NO. : 11/944417
DATED : September 7, 2010
INVENTOR(S) : Tsung-Chih Lin It is certified that error appears in the above-identified patent and that said Letters Patent is hereby corrected as shown below:

In column 4, line 24, delete "β a-" and insert -- β a-Δ --, therefor.

In column 4, line 35, delete "β a+Δ-β a-Δ," and insert -- β a+Δ~β a-Δ, --, therefor.

Signed and Sealed this

Twenty-first Day of December, 2010

David J. Kappos

David J. Kappos
*Director of the United States Patent and Trademark Office*